United States Patent
Gründl et al.

(10) Patent No.: US 6,755,161 B2
(45) Date of Patent: Jun. 29, 2004

(54) GAS EXCHANGE VALVE DRIVE FOR A VALVE-CONTROLLED COMBUSTION ENGINE

(75) Inventors: Andreas Gründl, München (DE); Bernhard Hoffmann, Starnberg (DE)

(73) Assignee: Compact Dynamics GmbH, Starnberg (DE)

(*) Notice: Subject to any disclaimer, the term of this patent is extended or adjusted under 35 U.S.C. 154(b) by 116 days.

(21) Appl. No.: 10/348,430

(22) Filed: Jan. 21, 2003

(65) Prior Publication Data

US 2003/0111029 A1 Jun. 19, 2003

Related U.S. Application Data

(63) Continuation of application No. PCT/EP01/08562, filed on Jul. 24, 2001.

(30) Foreign Application Priority Data

| Jul. 24, 2000 | (DE) | ................................ | 100 35 973 |
| Sep. 11, 2000 | (DE) | ................................ | 100 44 789 |
| May 28, 2001 | (DE) | ................................ | 101 25 767 |

(51) Int. Cl.$^7$ ................................................ F01L 9/04
(52) U.S. Cl. ........................ 123/90.11; 123/90.24; 251/129.01; 251/129.09; 251/129.15; 335/220
(58) Field of Search ................ 123/90.11, 90.24; 251/129.01, 129.09, 129.15, 129.2; 335/220; 361/147, 160; 310/14, 23; 318/671

(56) References Cited

U.S. PATENT DOCUMENTS

| 4,984,541 A | * | 1/1991 | Kawamura | ............... 123/90.11 |
| 5,115,772 A | * | 5/1992 | Kawamura | ............... 123/90.11 |
| 5,129,369 A | | 7/1992 | Kawamura | |
| 5,818,680 A | * | 10/1998 | Schmitz et al. | ............. 361/160 |
| 6,039,014 A | | 3/2000 | Hoppie | |
| 6,176,207 B1 | * | 1/2001 | Wright et al. | ............ 123/90.11 |
| 6,216,653 B1 | * | 4/2001 | Hara et al. | ............... 123/90.11 |

FOREIGN PATENT DOCUMENTS

| EP | 0390519 A1 | 10/1990 |
| EP | 0406443 A1 | 1/1991 |
| EP | 0485231 A1 | 5/1992 |
| JP | 05312013 A | 11/1993 |
| WO | WO 98/55741 | 12/1998 |

* cited by examiner

Primary Examiner—Thomas Denion
Assistant Examiner—Kyle Riddle
(74) Attorney, Agent, or Firm—Wood, Herron & Evans, L.L.P.

(57) ABSTRACT

The present invention relates to a gas exchange valve drive for a valve-controlled combustion engine with a hollow cylindrical rotor (16) to be coupled with a valve member (12) and a stator (18), wherein the rotor (16) comprises permanent-magnetic rings (30) concentrically arranged one above the other, the stator (18) is at least partially constructed of a soft magnetic material and comprises at least one tooth (22) facing towards the rotor (16), the stator (18) comprises a radially inner magnetically conductive area (50) and a radially outer magnetically conductive area (52), with the rings (30) of the rotor (16) being arranged between the inner area (50) and the outer area (52) of the stator (18), and the outer area (52) of the stator (18) in at least one partial section (54) is designed with a C-shaped cross-section and comprises at least one stator coil (28).

23 Claims, 5 Drawing Sheets

GAS EXCHANGE VALVE DRIVE FOR A VALVE-CONTROLLED COMBUSTION ENGINE

This application is a continuation of the "parent" PCT International Patent Application Number PCT/EP01/08562, entitled "Gas Exchange Valve Drive For A Valve-Controlled Combustion Engine," filed with the European Patent Office on Jul. 24, 2001, which designates the United States, and which claims priority to German Application Numbers DE 100 359 73.6, filed on Jul. 24, 2000, DE 100 44 789.9, filed on Sep. 11, 2000, and DE 101 25 767.8, filed on May 28. 2001.

BACKGROUND OF THE INVENTION

The present invention relates to a gas exchange valve drive for a valve-controlled combustion engine. In particular, the invention relates to a gas exchange valve where the reciprocating movement of the valve member is not effected and controlled by a cam shaft. Rather, the valve member is electrically actuated by the inventive gas exchange valve.

STATE OF THE ART

From DE 195 18 056 A1 a gas valve control with a gas exchange valve is known, which is actuated by an electromagnet arrangement. By means of a special configuration of the pole shaft of the electromagnet arrangement, a signal related to the movement of the armature is generated in the control line of the electromagnet arrangement. This signal can be evaluated for detecting any armature position without additional sensors. A considerable problem with the employment of an electromagnet arrangement for operating the valve is the high noise level developing upon reaching the respective end positions, the abrupt braking upon reaching the end positions, as well as the required high holding currents.

The same applies to differential electromagnet arrangements which have been proposed on several occasions, which are specifically subjected to an increasing current for achieving the required thrust of approx. 300–400 N for combustion engines of passenger cars. Therein, the valve which is biased by a spring arrangement initially performs an oscillating movement before an iron plate arranged at the valve shaft abuts the armature of the electromagnet arrangement so that a much lower holding current is required. Here, the maximum speed of the engine, however, is considerably limited. The start-up time upon starting is relatively long because of the required high force it takes some time for the valve arrangement to oscillate into its desired position.

From JP-A-3-92518 a drive means for a valve arrangement in combustion engines is known, wherein the stator is built from two approximately semi-cylindrical shells which comprise teeth, split both in the circumferential direction and in the longitudinal direction of each shell, facing towards the rotor. The individual teeth of each shell are each surrounded by a coil the center longitudinal axis of which extends in the radial direction. This results in a magnetic flux oriented in the radial direction, which originating from each of the plurality of teeth flows through the air gap between stator and rotor into the rotor.

An insofar corresponding configuration of the stator, the stator coils, and the rotor of a drive means for a valve arrangement in combustion engines is described in U.S. Pat. No. 5,129,369. In this case, too, teeth of the stator, which are split in the radial and tangential direction, are surrounded by a coil each whose center longitudinal axis extends in the radial direction.

EP 0 485 231 A1, too, shows a similar type of the stator design, the stator coils, and the rotor of a drive means for a valve arrangement in combustion engines. In this case, too, teeth of the stator, which are split in the radial and tangential direction, are surrounded by a radially oriented coil each.

These arrangements necessitate a very high manufacturing expenditure because the assembly of the coils around the individual teeth is difficult to realize. Moreover, the pole pitch which can be achieved with this construction is relatively large.

From WO98/55741 a valve arrangement for a valve-controlled combustion engine is known, with an electric travelling-field motor as an actuator for a valve member, which comprises a rotor coupled with a valve member and a stator. The stator is built from plates whose surfaces are oriented vertically to the direction of movement of the rotor. The stator has teeth facing towards the rotor which is designed as a synchronous or asynchronous rotor, each of which having a closed lateral cylinder area facing towards the rotor. Between two neighbouring teeth each of the stator, stator coil chambers are formed in which a coil each is arranged with is oriented parallel to the area of the plates.

From U.S. Pat. No. 6,039,014 a valve arrangement driven by a linear motor for a combustion engine is known. Here, the stator of the linear motor comprises several coils which are separated from each other by a ferromagnetic housing section each. A rotor is built from several sections of a permanent-magnetic material, between which sections are arranged, each consisting of a ferromagnetic material.

Further documents which show the technical background for the invention include, without claiming to be exhaustive: DE 33 07 070 A1; DE 35 00 530 A1; EP 244 878 B1; WO90/07635; U.S. Pat. No. 4,829,947; EP 377 244 B1; EP 347 211 B1; EP 390 519 B1; EP 328 194 B1; EP 377 251 B1; EP 312 216 B1; U.S. Pat. Nos. 4,967,702; U.S. Pat. No. 3,853,102; U.S. Pat. No. 4,829,947; U.S. Pat. No. 4,915,015; WO90/07637, WO90/07637; EP 328 195 A2.

Problem on Which the Invention is Based

All concepts which are described in the above mentioned documents have in common that they are unable to achieve the stroke, thrust, and dynamics required for gas exchange valves in combustion engines with adequate compact construction and high reliability for large series application in automotive engines. Moreover, known arrangements are manufactured in a very space consuming and expensive manner. Finally, these arrangement are also not suited for the application in high-speed (fast-running) combustion engines, because none of these arrangements is optimized with respect to the moved masses.

Invention Solution

For the elimination of these drawbacks, the invention teaches a gas exchange valve drive for a valve-controlled combustion engine with a linear motor as the actuator for a valve member, which is defined by the characteristics of Claim 1.

Construction and Advantages of the Invention Solution

According to the invention the gas exchange valve drive for a valve-controlled combustion engine has a hollow cylindrical rotor to be coupled with a valve member, and a stator, with the rotor comprising permanent-magnetic rings arranged concentrically above each other, the stator being at least partially formed from a soft magnetic material and comprising at least one tooth facing towards the rotor, the stator comprising a radially inner magnetically conductive area and a radially outer magnetically conductive area, with the rings of the rotor being arranged between the inner area and the outer area of the stator, and the outer area of the stator having a C-shaped cross-sectional configuration in the radial direction in at least one partial section and comprising at least one stator coil.

The concept on which the invention is based consists in spatially "removing" the portion of the stator which effects the armature magnetomotive force, i.e. the coil area with the stator coil, from the portion generating the force of the linear motor, i.e. the tooth area of the stator. Compared to conventional linear motors where the stator coils are arranged between two teeth each of the stator, a considerably higher magnetomotive force of the armature can be achieved. This is dues to the fact that the coil is subjected to considerably less spatial restrictions due to the inventive design and can therefore to optimized to minimal (ohmic) losses- and the associated maximal magnetic field induction. By the dimensions of the permanent-magnetic rings in the direction, of movement of the rotor or the dimensions of a tooth of the stator in the direction of movement of the rotor, respectively, a pole pitch is defined which is smaller than the dimension of the stator coil in its longitudinal direction.

Simultaneously, the rotor magnetic pole/stator tooth arrangements generating force or movement, respectively, are concentrated so that these are not interrupted by stator coils. This allows a very small pole pitch which in turn effects a high force density. In addition, the inventive arrangement allows partial strokes of the valve member. Thus, it is possible with a combustion engine equipped with the inventive gas exchange valve drives to dispense with a throttle valve for metering the air/fuel mixture and its associated control.

By the inventive design magnetic flux is induced in the C-shaped yokes of the outer area of the stator by the stator coil(s) arranged there, which flows from the radial sections of the C-shaped yokes via the annular air gap in which the hollow cylindrical permanent magnets are arranged into the inner (cylindrically shaped) area of the stator. From the inner area of the stator, the magnetic circuit is closed again towards the C-shaped yokes of the outer area of the stator.

A further essential advantage of the inventive gas exchange valve drive is that virtually only the magnetically effective components (the permanent magnets) contribute to the inert mass of the rotor, while all other parts of the motor (coils, magnetic yoke, etc.) are associated with the stator. This makes it possible to achieve a particularly high ratio between the force exerted by the motor and inert mass. Moreover, the inventive gas exchange valve drive is excellently suited to be employed in high-speed combustion engines. This allows in particular the approach of the valve member to the end positions (open or closed position of the gas exchange valve) at high speed with high changes in acceleration, so that the valve member contacts the valve seat at minimum speed, while the valve member is otherwise moved at very high speeds. Moreover, the maximum force is available in the end areas of the course of movement. This allows a very low-noise and low-wear operation of the inventive gas exchange valves, which is simultaneously very reliable due to the attainable high holding forces in the end positions.

Due to the fact that several single-phase motors connected in series which can be controlled individually can be provided in the inventive gas exchange valve drive, the total generated force along the stroke travel of the valve member can be adjusted exactly to the force required in the respective instance. In this context it should be noted that the inventive gas exchange valve drive is generally to be operated in a single-phase manner. It is, however, also possible to operate the stator coils of the individual motors arranged one above the other in a multi-phase manner. Due to the inventive arrangement it is not necessary to subject the valve member with a considerable kinetic energy in order to have it assume its end position.

Due to the arrangement of the stator coil(s) which can be formed very simple (single-phase and cylindrical) it is possible to keep the vibratory forces low acting on the coil so that vibrations of the coil or friction of the coil against the wall of the stator coil chamber are low. Thus it is possible to do with a minimum amount of insulating material or liner material, respectively, of the stator coil chamber. This also contributes to the compactness and reliability of the overall arrangement. In addition, this causes a high power density even with small gas exchange valves, because the space filling factor (coil volume in the stator coil chamber related to the total volume of the stator coil chamber) is high.

Compared to the known (e.g. from U.S. Pat. No. 6,039, 014) arrangements, the inventive arrangement minimizes the leakage fluxes and allows a very efficient assembly of several gas exchange valves arranged adjacent to one another, with neighboring gas exchange valve drives being able to at least partially alternately utilize the magnetic yoke. This enables the minimization of mass and volume of the magnetic yoke body.

Developments of the Inventive Solution

The coil area in the direction of movement of the rotor is preferably larger than the distance between two neighboring teeth of the stator.

The stator can be formed in a known manner from electric sheet steel parts. For a simplified manufacture it is, however, also possible to form it, at least partially, from a soft magnetic form body, preferably from pressed and/or sintered metal powder. Preferably, the stator comprises a strip-wound coil from soft magnetic sheet metal strip, with a soft magnetic form body, each, preferably from pressed and/or sintered metal powder, being arranged at the faces for forming the teeth. In order to increase the saturation inductance of the stator it is also advantageous that the soft magnetic forming body of the stator comprises at least one core with cobalt-containing iron in its interior, which is preferably formed as a sheet metal wound coil.

In a preferred embodiment, the stator is assigned a displacement sensor for detecting the stroke of the valve member. This can, for example, be an interferometer or an inductive sensor with a carrier frequency. This is advantageous in particular, because also partial strokes (i.e. intermediate positions between open and closed) of the valve arrangement are possible with the inventive actuator. This partial stroke can be sensed or controlled, respectively, via the sensor.

The rotor is at least partially surrounded by a magnetic yoke body of the stator. The coil of the stator can then be arranged either at the stator or in the magnetic yoke body.

The magnetically alternately oriented permanent magnet rings can additionally be maintained at a predetermined distance from one another by magnetically not effective spacers from a light material (aluminum, titanium, synthetic material—also with glass or carbon fiber reinforcement or the like). Thus, the inert mass of the rotor can be kept small.

According to the invention the stator is constructed from a soft magnetic material and has teeth facing towards the rotor. Between two neighboring teeth of the stator a winding chamber can be formed in which a winding is arranged. The rotor comprises rings from permanent-magnetic material. These magnet rings are concentrically arranged one above the other and their magnetic orientation is designed in such a manner that in a predetermined position of the rotor two teeth each of the stator are in alignment with a magnet ring with the opposite magnetic orientation.

For forming an external rotor motor the stator is at least partially surrounded by the rotor—separated by an air gap. In a similar manner, the rotor is at least partially surrounded by the stator for forming an internal rotor motor. According to the invention it is also possible to form the stator by permanent magnet disks arranged above each other, while the rotor comprises a winding chamber which is defined by corresponding soft magnetic annular disks.

The high force density which can be realized with the inventive embodiments can be achieved among other things by dimensioning the teeth or the permanent magnets, respectively, which are located opposite them relative to the axial extension of the winding chamber sufficiently short so that there is space available for at least two further permanent magnets (each with a different magnetic orientation).

According to the invention, the rotor of a preferred embodiment is at least partially surrounded by a magnetic yoke body. In particular in the case of the employment of several gas exchange valves arranged side by side, it is advantageous to provide at least two winding chamber with teeth, windings in the stator and corresponding permanent magnets in the rotor at each gas exchange valve, with the winding in the neighboring gas exchange valve being controlled in an opposite sense in such a manner that the magnetic fluxes through the magnetic yoke body comprise as little leakage flux proportions through the magnetic yoke body as possible. Thus the volume—and the weight—of the magnetic yoke body can be kept small. Moreover, the power losses are minimized thereby. An essential aspect is that the magnetic yoke body comprises the shape of a section tube with an approximately rectangular cross-section, with two opposite walls being provided with break-outs through which the inner part of the stator (coil arrangements) and the rotor protrude. This arrangement minimizes the leakage flues and allows, in particular, a very efficient assembly of several such gas exchange valves arranged side by side, wherein—under the provision of a corresponding electric control neighboring gas exchange valve drives can at least partially alternately utilize the magnetic yoke. This enable the minimization of mass (and volume) of the magnetic yoke body.

Finally, the invention relates to an engine with internal combustion with at least one combustion cylinder with at least one valve arrangement for inlet or outlet valves with one or several of the above characteristics.

Properties of the Inventive Gas Exchange Value Drive

From the inventive design of the gas exchange valve drive the following properties result:

High dynamics with low power consumption.

A spring arrangement for the compensation of the forces generated by moved masses is not required to realize an end position change (from open to closed or vice versa) of the valve member in less than 1.5 ms at an average power consumption over two complete crankshaft rotations of less than approx. 100 W with a mass of the valve member of approx. 30–70 g, a valve stroke of approx. 5–10 mm, and a speed of a 4-cylinder combustion engine of at least 6000 rpm. 10 mm, and a speed of a 4-cylinder combustion engine of at least 6000 rpm.

In the respective end positions of the valve member, only low holding currents are required for reliably holding the valve member in the respective position.

Due to the fact that a spring arrangement is dispensed with (see above), the otherwise necessary oscillatory action of the valve member is omitted. This reduces the duration of the setting operation.

By means of the inventive actuator, the valve member can precisely be brought into any desired position from virtually each current position. This applies in particular to the end positions which can very precisely be approached by the valve member. It is thus possible—by means of a corresponding electronic control of the coil(s)—to ensure an impact of the valve member on its valve seat with less than 40 mm/s. This keeps wear and noise generation of the valve arrangement during operation at a very low level.

The valve member—though rigidly connected with the rotor—may be supported rotatably with respect to its valve seat about its axis of movement so that punctual wear of the valve member or the valve seat is avoided.

Due to the high power density of the inventive arrangement the transverse dimensions (diameters) of the gas exchange valve with the required specifications can be kept very small. This allows the employment in compact passenger car engines.

Further characteristics, properties, advantages, and possible modifications will be explained with reference to the following description in which the accompanying drawings are referred to.

BRIEF DESCRIPTION OF THE DRAWINGS

FIG. 2b illustrates a sectional view along line II—II in the embodiment according to FIG. 2a.

DESCRIPTION OF PREFERRED EMBODIMENTS OF THE INVENTION

Corresponding numerals in the figures identify identical parts or parts to the same effect, which are not repeatedly explained in the following.

Figure 1:
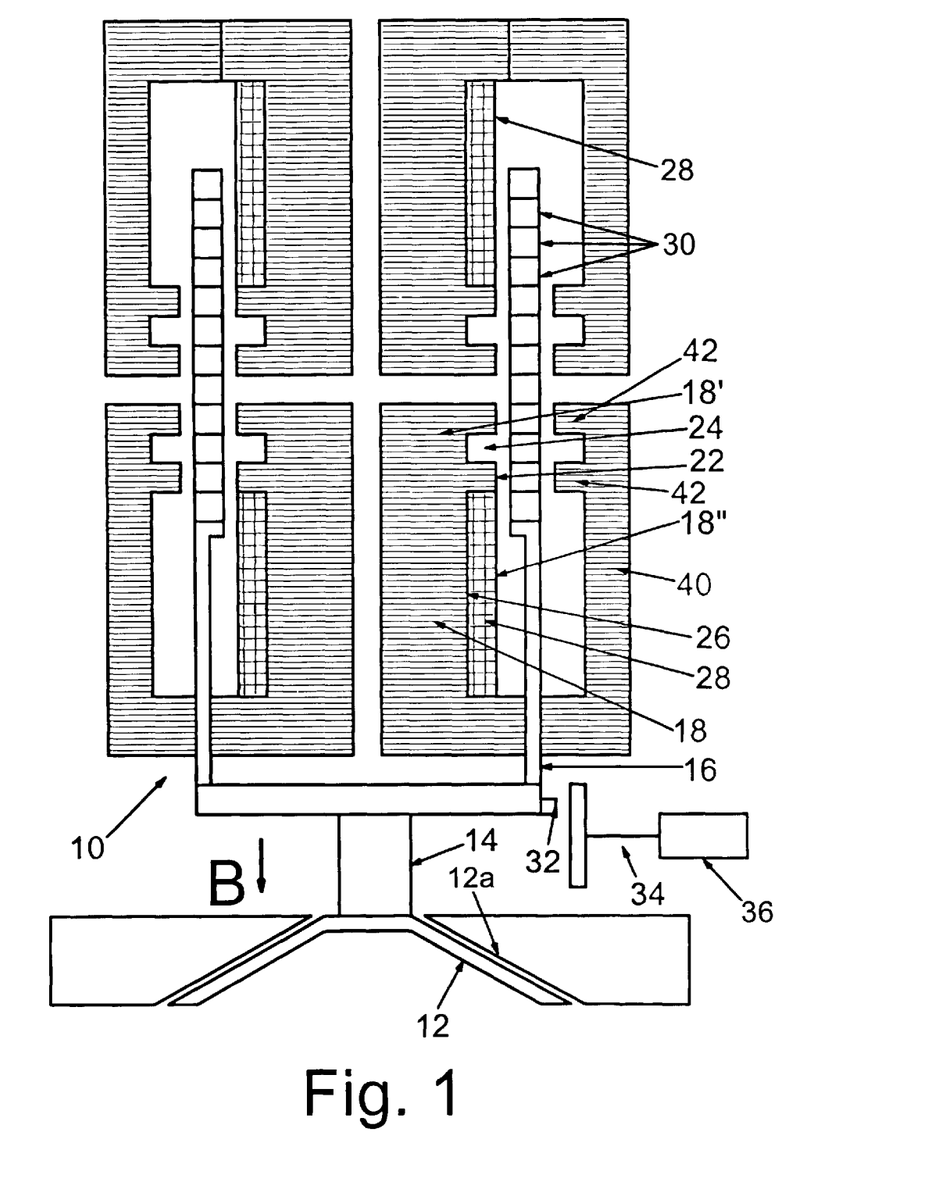
FIG. 1 illustrates a first embodiment of an inventive gas exchange valve drive as a schematic longitudinal section.

FIG. 1 illustrates a first embodiment of en electric linear motor 10 which, in the inventive valve arrangement, serves as an actuator for a valve member 12 of a gas exchange valve whose associated valve seat 12a is shown only schematically. The linear motor 10 has a rotor 16 coupled with the valve member 12 via a rod 14 and a stator 18.

The stator 18 in this embodiment is formed as a soft magnetic form body of an essentially hollow cylindrical shape and a core located therein from sintered iron metal powder. The form body is functionally divided into a tooth area 18' and a coil area 18" adjacent to the tooth area 18' but separated from same.

The tooth area 18' of the stator 18 has two teeth 22 in its circumference facing towards the rotor 16 with a closed lateral area. In the present example with the form bodies having a circular plan view, the individual teeth 22 have a circular cylindrical lateral area. It is, however, also possible to use oval form bodies or form bodies with a polygon shape for the construction of the stator 18.

The two teeth 22 of the stator 18 define an annular groove 24 between them which extends parallel to the teeth 22 and whose dimension in the present embodiment in the direction of movement B of the rotor 16 corresponds to the dimension of the two teeth 22.

Adjacent to the tooth area 18', the stator 18 comprises the coil area 18" which has a stator coil chamber 26 which is open towards the outside and in which a stator coil 28 is arranged concentrically to the centre longitudinal axis of the stator 18. For achieving a filling factor as high as possible, the stator coil 28 is designed as a copper strip coil. The type of connecting the individual coils 28 or the time-controlled application of electric current, respectively, depends on the desired motor type (single-phase or multi-phase motor), with a single-phase operation being simpler and therefore to be preferred.

Due to the fact that each coil 28 with its entire extension is arranged in the stator coil chamber 26, it also contributes with its entire length to the effective force generation in the electric motor.

In the shown arrangement the rotor 16 is a hollow cylinder which comprises magnet rings 30 from a permanent-magnetic material (e.g. samarium cobalt). The individual magnet rings 30 are concentrically arranged above each other, with the magnetic orientation of the magnet rings being alternately radially oriented and the rings with respect to their dimensions being so designed that in a predetermined position of the rotor 16 two teeth 22 of a stator 18 are in alignment with one magnet ring 30 each of the same magnetic orientation.

For the reduction of the inert mass of the rotor 16, magnetically not effective hollow cylindrical spacers of synthetic material, e.g. carbon fibre-reinforced plastic, can be inserted between two successive magnet rings 30. The contacting permanent magnet rings and the magnetically not effective hollow cylinders are securely joined with each other. In other words, in the moving part of the motor (rotor) there are no parts conducting the magnetic flux (e.g. flux conducting pieces) but only permanent magnets which are always optimally arranged in the magnetic field. This arrangement is also advantageous in that it is weight-saving. If radially oriented annular disks from a permanent-magnetic material cannot generate an adequate field strength, it is also possible according to the invention to combine annular disk segments from permanent magnets in such a manner that a radially (from the inside to the outside or vice versa) oriented magnetic field is generated transversely to the direction of movement of the rotor 16.

The distance between the teeth 22 relative to the dimension of the teeth 22 in the direction of movement B of the rotor 16 may vary. This, however, also necessitates a corresponding design of the magnet rings 30 of the rotor 16 because the periodicity of the magnet rings 30 of the rotor 16 must be equal to the periodicity of the teeth 22 or of their intermediate annular grooves 24, respectively, at the stator 18.

At the rotor 16 a displacement transducer 32 is arranged which is sampled by means of a corresponding probe 34.

As the magnetic yoke a hollow cylindrical tube 40 as part of the stator is provided which at one end portion (in FIG. 1 on top) comprises two teeth 42 projecting radially inwards, which in the assembled condition of the stator 18 are in alignment with the teeth 22 of the stator 18. The other end portion of the hollow cylindrical tube 40 terminates in the outer border of the coil area 18".

FIG. 1 shows two stators 18 arranged one above the other which are penetrated by a common rotor 16. This makes it possible with a corresponding control of the two coils 28 of the stator 18 to realize a two-phase linear drive.

Figure 2A:
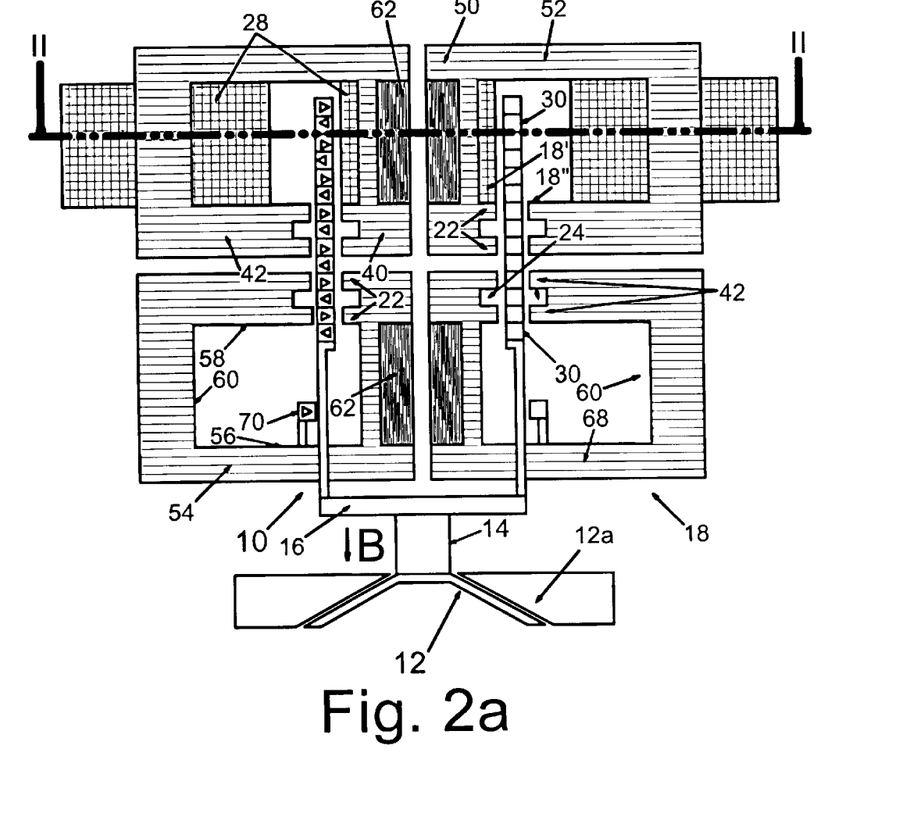
FIG. 2a illustrates a second embodiment of an inventive gas exchange valve drive as a schematic longitudinal section.

Instead of, or in addition to, the arrangement of the coil 28 on the outer circumference of the coil area 18' it is also possible to arrange the coils 28 at the radially outer portion of the magnetic yoke 40. This will be explained in conjunction with the embodiment depicted in FIG. 2.

FIG. 2 shows a gas exchange valve drive with a stator 18 and a hollow cylindrical rotor 16 which is constructed from permanent magnet rings 30 arranged concentrically above each other with alternating magnetic orientations.

The stator 18 is essentially formed from a soft magnet material and comprises a radially inner magnetically conductive area 50 and a radially outer magnetically conductive area 52. The magnet rings 30 of the rotor 16 are arranged in the air gap between the inner area 50 and the outer area 52 of the stator 18.

Each of the inner area 50 and the outer area 52 is provided with two teeth 22 in alignment with each other and facing towards the rotor 16, which are separated by an annular groove 24 and are also in alignment with one of the magnet rings 30 of the rotor 16. The inventive arrangement is also operative with only one tooth 22 each at the inner area 50 and the outer area 52, each of which being in alignment with one each of the magnet rings 30 of the rotor. The inventive arrangement is also operative if one tooth 22 is formed on the inner area 50 or on the outer area 52 only, which is in alignment with one of the magnet rings 30 of the rotor.

In the embodiment shown in FIG. 2, too, two neighbouring rings 30 each of the rotor 16 can be maintained at a predetermined distance from one another by means of magnetically not effective spacers.

In the same manner as in the embodiment according to FIG. 1, the coil of the stator 18 is greater than the distance or space, respectively, between two neighbouring teeth 22 of the stator 18.

An essential difference between the embodiment according to FIG. 1 and the embodiment according to FIG. 2 is that in FIG. 2 the stator coil does not only coaxially surround the radially inner area 52 of the stator 18 as in FIG. 1. For this purpose the radially outer area 52 of the stator 18 is designed as two radially opposite partial sections 54 with a C-shaped cross-section. Each of the C-shaped cross-sections 54 has two radially oriented legs 56, 58 which are spaced relative to each other in the direction of the movement B of the rotor 16. The radially oriented legs 56, 58 are connected with each other by means of a connecting yoke 60 which is oriented essentially in the direction of movement B of the rotor 16.

Each of the connecting yokes 60 carries a stator coil 28. Though not shown, it is also possible according to the invention to provide radially oriented stator coils at the radial legs 56, 58 in addition to or instead of the illustrated stator coils 28 which are oriented parallel to the direction of movement of the rotor 16.

For the sake of clarity, the stator coils 28 are only depicted in the upper motor unit in FIG. 2*a*, while they are omitted in the lower motor unit in FIG. 2*a*.

The stator 18 with its radially inner and radially outer areas is a soft magnetic form body from pressed and sintered metal powder. A wound sheet metal core 62 with cobalt-containing iron is introduced into the metal powder of the form body prior to pressing and sintering in the radially inner area of the stator 18 in the direction of the magnetic flux and along the direction of movement of the rotor 16. The wound sheet metal core 62 with cobalt-containing iron can virtually completely fill the stator 18 in its inner part, so that no soft magnetic pressed and sintered metal powder is provided between the wound sheet metal core 62 and the stator coil 28. In the same manner, wound sheet metal cores with cobalt-containing iron can be introduced in the same manner into the radially outer part of the stator 18 in the direction of the magnetic flux, if required.

Where the geometric conditions permit, it is also possible to cylindrically surround the radially inner area 40 of the stator 18 with a stator coil 28, too, as is shown in FIG. 2*a* in the upper motor unit. In this case, the magnetic fluxes induced by the stator coils are added with an equiphase control.

Figure 2B:
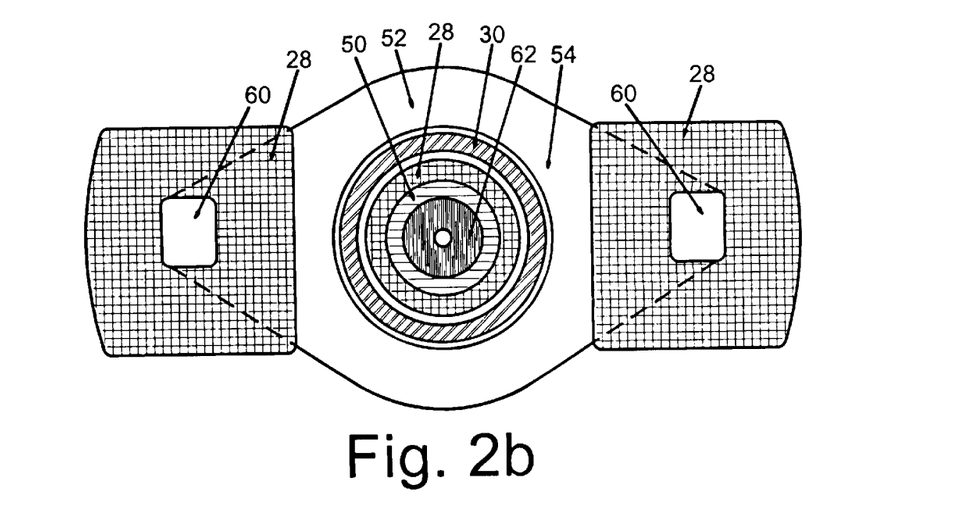

As shown in FIG. 2*b*, two partial sections 54 of the radially outer part of the stator 18 are arranged distributed along the circumference of the stator 18 with one stator coil 28 each. It is, however, also possible to distribute more than two of the partial sections 54 with C-shaped cross-section, comprising the corresponding stator coils along the circumference of the stator 18.

In addition, a braking and holding means for the rotor 16 in its lower end position (i.e. in the open position) is illustrated in FIG. 2. For this purpose, a magnet ring 70 with a radial magnetic orientation surrounding the rings 30 of the rotor 16 or surrounded by them is arranged stationary in the area of a respective stop of the rotor 16. The magnet ring 70 is arranged with respect to the direction of movement of the rotor 16 and, in particular, with respect to the end position of the lower ring 30 of the rotor 16 in such a manner that the lowermost ring 30 of the rotor 16 can completely pass the magnet ring 70 before it reaches the lower stop. The magnetic orientation of the magnet ring 70 and the lower ring 30 of the rotor is selected in such a manner that, for example, both rings are magnetic N poles which are facing towards each other. It is understood that such a braking and holding means for the rotor 16 can also be provided at the upper end position and that it is also applicable in the embodiment according to FIG. 1.

Figure 3:
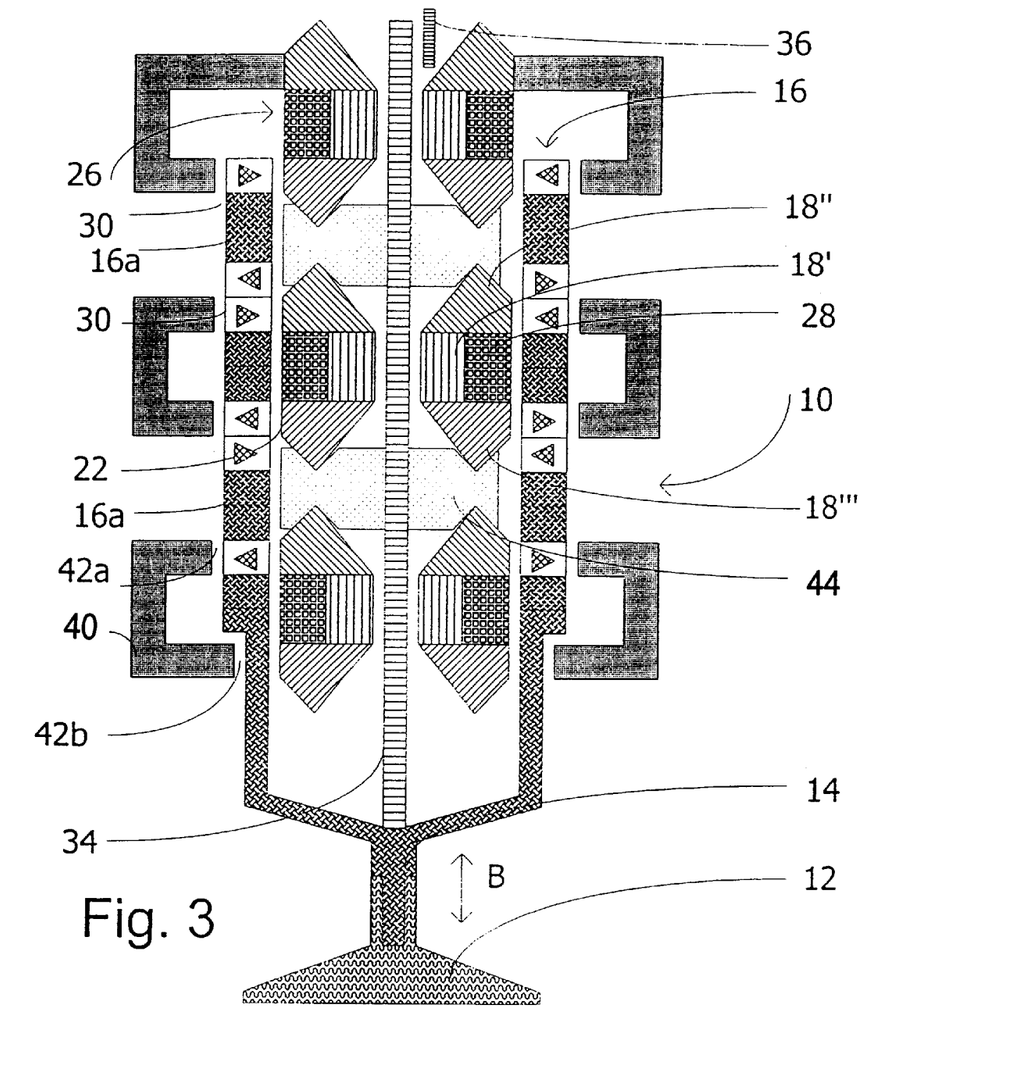
FIG. 3 illustrates a third embodiment of an inventive gas exchange valve drive as a schematic longitudinal section.

FIG. 3 illustrates a further embodiment of the inventive gas exchange valve drive for a valve-controlled combustion engine as a schematic longitudinal section.

In this embodiment, the core of the stator 18 is a hollow cylindrical strip-wound coil 18' from a soft magnetic sheet metal strip, preferably of iron/cobalt sheet metal, whose surface is oriented parallel to the axis of movement B of the rotor 16. At both faces of the strip-wound coil 18', a soft magnetic form body 18", 18'" each from sintered iron metal powder is arranged which project beyond the strip wound coil 18' in the radial direction. The form bodies 18", 18'" of the stator 18 form teeth 22 with a closed lateral area at their circumference which face towards the rotor 16. In the present example with circular form bodies 18", 18'" in the plan view the individual teeth 22 have a circular cylindrical lateral area. It is, however, also possible to use oval form bodies 18", 18'" or form bodies 18", 18'" with a polygon shape for the construction of the stator 18.

The hollow cylindrical strip-wound coil 18' and the circular form bodies 18", 18'" in the plan view form a stator coil chamber 26 which is open to the outside in which a stator winding 28 formed as a copper strip coil is arranged concentrically to the longitudinal centre axis of the stator 18.

The stator 18 has a recess in its centre, in which a bar 34 with a toothed profile etched in its circumference is sampled by means of a Hall probe 36. The lower end (in the figure) of the bar 34 is rigidly coupled with the valve member 12 or the rod 14, respectively, so that the Hall probe 36 can detect a movement of the bar 34 in the direction of movement B.

In the arrangement shown in FIG. 3 the rotor 16 is a hollow cylinder which comprises rings 30 from a permanent-magnetic material (e.g. samarium cobalt). The individual permanent-magnetic rings 30 are concentrically arranged above each other, with the magnetic orientation of the permanent-magnetic rings 30 (indicated by the arrows in each ring, pointing towards the stator centre, or away from it, respectively) being so designed that in a predetermined position of the rotor 16 two teeth 22 of a stator 18 are in alignment with one magnet ring 30 each of the opposite magnetic orientation. In particular in the shown embodiment with three or more stator coils arranged above each other, one magnet ring 30 may be in alignment with a tooth of the first stator (for example the middle one), while the second magnet ring 30 is in alignment with a tooth of a second stator (e.g. the lower one). It is, however, also possible that both magnet rings 30 are in alignment with both teeth of a stator.

The rotor 16 is constructed of permanent magnet rings which are stacked above each other and firmly joined with each other.

As the magnetic yoke a magnetically conductive tube 40 with a rectangular cross-section is provided which comprises recesses 42*a*, 42*b* in two opposite walls, through which the rotor 16 and the stator protrude. The walls of the tube 40 have such a material thickness and such a distance from each other that they are in alignment with two teeth 22 of a stator 18.

Two neighboring stators 18 in the direction of movement B of the rotor 16 of a gas exchange valve are firmly joined with each other via an aluminum rail 44 which serves as a spacer and an eddy-current shielding.

In the embodiment shown in FIG. 3, three stators 18 are arranged one above the other. In the most lightweight embodiment of the rotor, two magnet rings 30 may be arranged in a spaced relationship. Preferably, however, at least four magnet rings 30 are provided, with two magnet rings 30 each (i.e. one pair of magnet rings) with opposite magnetic orientation being either in direct contact or having only a small (axial) distance from one another. By establishing the distance of the magnet rings 30 from one another or of rings of the magnet ring pair 30, respectively, the course of the stroke can be influenced.

Figure 4:
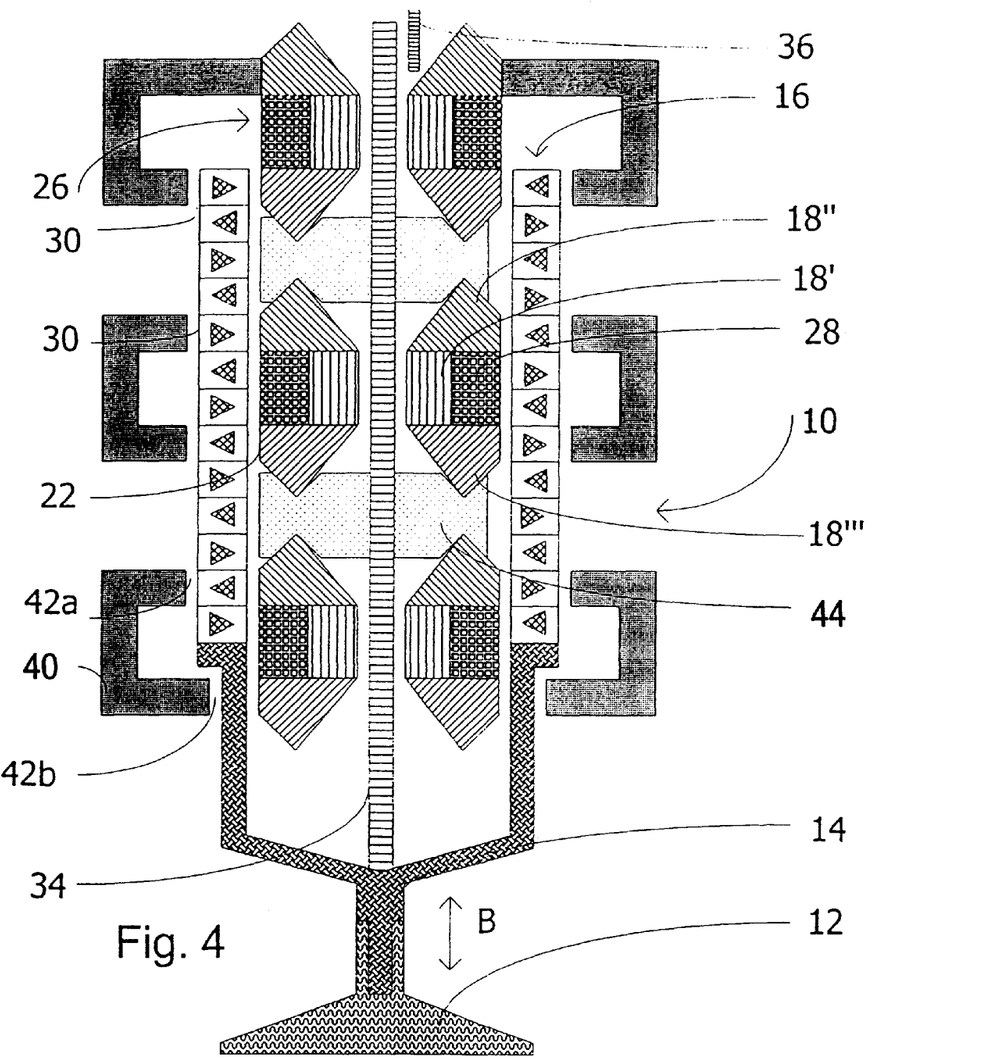
FIG. 4 illustrates a fourth embodiment of an inventive gas exchange valve drive as a schematic longitudinal section.

In the arrangement shown in FIG. 4 the rotor 16 is a hollow cylinder which comprises rings 30 from a permanent-magnetic material (e.g. samarium cobalt). The individual permanent-magnetic rings 30 are concentrically arranged above each other, with the magnetic orientation of the permanent-magnetic rings 30 (indicated by the arrows in each ring, pointing towards the stator centre, or away from it, respectively) being so designed that in a predetermined position of the rotor 16 two teeth 22 of a stator 18 are in alignment with one magnet ring 30 each of the opposite magnetic orientation. In particular in the shown embodiment according to FIG. 1 with three or more stator coils arranged above each other, one magnet ring may be in alignment with a tooth of the first stator (for example the middle one), while the second magnet ring is in alignment with a tooth of a second stator (e.g. the lower one). It is, however, also possible that both magnet rings are in alignment with both teeth of a stator.

As a magnetic yoke being part of the stator a magnetically conductive tube 40 with a rectangular cross-section is provided which comprises recesses 42a, 42b in two opposite walls, through which the rotor 16 and the stator protrude. The walls of the tube 40 have such a material thickness and such a distance from each other that they are in alignment with two teeth 22 of a stator 18.

Two neighbouring stators 18 of a gas exchange valve are firmly joined with each other via an aluminium rail 44 which serves as a spacer and an eddy-current shielding.

In the embodiment shown in FIG. 4, three stators are arranged one above the other. In the most lightweight embodiment of the rotor, two magnet rings may be arranged in a spaced relationship. Preferably, however, at least four magnet rings 30 are provided, with two magnet rings 30 each (i.e. one pair of magnet rings) with opposite magnetic orientation being either in direct contact or having only a small (axial) distance from one another. By establishing the distance of the magnet rings 30 from one another or of rings of the magnet ring pair 30, respectively, the course of the stroke can be influenced. Between two rings 30 of opposite magnetic orientation a magnetically not effective hollow cylinder, e.g. from carbon fibre reinforced plastic, is arranged so that as a whole less magnet rings as stator teeth are provided. This has the advantage of weight saving, requires, however, a control with higher power.

Figure 5:
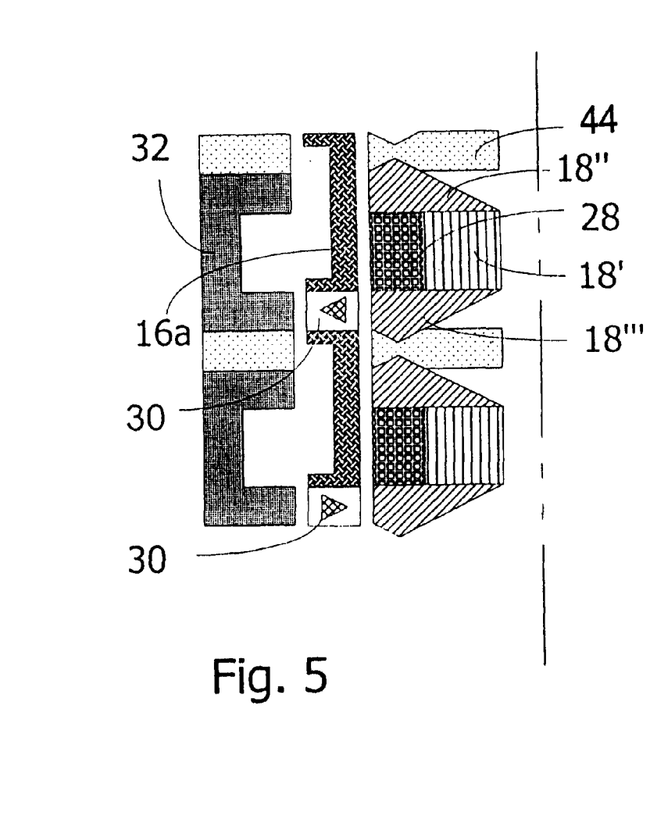
FIG. 5 illustrates a fifth embodiment of an inventive gas exchange valve drive as a partial schematic longitudinal section.

In the embodiment shown in FIG. 5 the stators are principally unchanged, but the axial distance between the tubes 40 is reduced in that the spacer 44 has a smaller height. In addition, the number of the magnet rings 30 is considerably reduced compared to the embodiment of FIG. 1, which means a significantly reduced moved mass. In this context it should be mentioned that the merely one magnet ring per magnet coil or stator pole pair, respectively, constitutes the minimum number. With this arrangement the direction of the magnetic flux is no longer relevant, as long as the magnetic flux is oriented in the radial direction.

Figure 6:
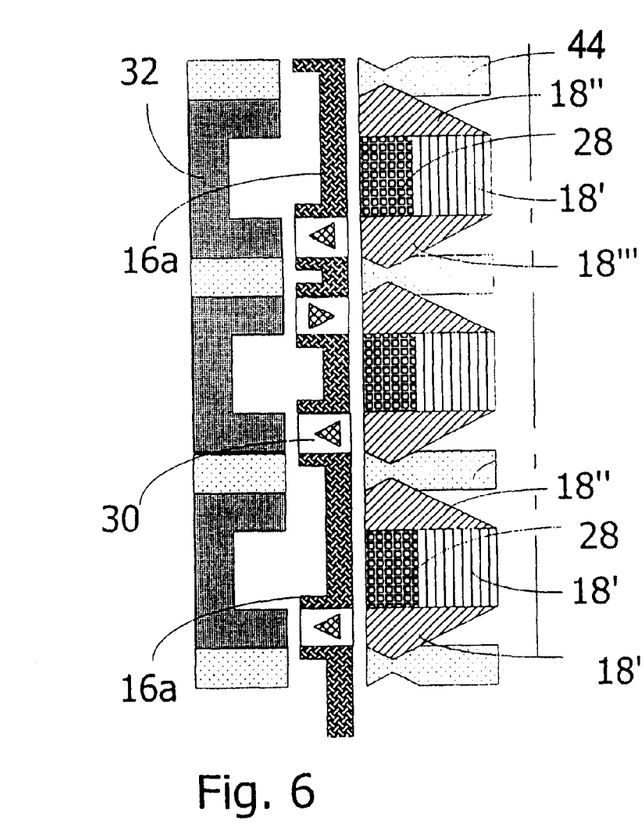
FIG. 6 illustrates a sixth embodiment of an inventive gas exchange valve drive as a partial schematic longitudinal section.

A further embodiment is shown in FIG. 6, where the spacers 16a between the magnet rings 30 are dimensioned in such a manner that the middle coil is assigned two magnet rings 30, while the upper and lower coil is assigned only one magnet ring 30 each.

It is understood that individual or several aspects of an embodiment can also be combined with other aspects or details of another embodiment.

The explained embodiments are particularly suited for realizing the required stroke of approx. 20 mm with the require dynamics in the relatively narrow installation space available.

What is claimed is:

1. A gas exchange valve drive for a valve-controlled combustion engine with
   a hollow cylindrical rotor (16) to be coupled with a valve member (12) and a stator (18), wherein
   the rotor (16) comprises permanent-magnetic rings (30) concentrically arranged one above the other,
   the stator (18) is at least partially constructed of a soft magnetic material and comprises at least one tooth (22) facing towards the rotor (16),
   the stator (18) comprises a radially inner magnetically conductive area (50) and a radially outer magnetically conductive area (52), with the rings (30) of the rotor (16) being arranged between the inner area (50) and the outer area (52) of the stator (18), and
   the outer area (52) of the stator (18) in at least partial section (54) is designed with a C-shaped cross-section and comprises at least one stator coil (28).

2. The gas exchange valve drive according to claim 1, wherein neighboring permanent-magnetic rings (30) of the rotor (16) comprise radially oriented alternating magnetic orientations.

3. The gas exchange valve drive according to claim 1, wherein two neighboring rings (30) each of the rotor (16) are maintained in a predetermined distance from each other by means of magnetically not effective spacers.

4. The gas exchange valve drive according to claim 1, wherein in the radially inner magnetically conductive area (50) of the stator (18) and/or in the radially outer magnetically conductive area (52) of the stator (18) at least one tooth (22) is formed in the direction of movement of the rotor (16), whose dimension in the direction of movement of the rotor (16) is essentially the same as the dimension of a permanent-magnetic ring (30) in the direction of movement of the rotor (16), so that in a predetermined position of the rotor (16) the at least one tooth (22) of the stator (18) is in alignment with one permanent-magnetic ring (30).

5. The gas exchange valve drive according to claim 1, wherein a pole pitch is defined by the dimensions of the permanent-magnetic rings (30) in the direction of movement of the rotor (16) and the at least one tooth (22) of the stator (18), which is smaller than the dimensions of the stator coil (28) in its longitudinal direction.

6. The gas exchange valve drive according to claim 1, wherein the inner area (50) of the stator (18) comprises a stator coil (28) in addition to our instead of the outer area (52) of the stator (18).

7. The gas exchange valve according to claim 4, having a coil area (18") in the direction of movement of the rotor (16) that is greater than the distance between two neighboring teeth (22) of the stator (18).

8. The gas exchange valve drive according to claim 1, wherein the stator (18) is a soft magnetic form body, preferably from pressed and/or sintered metal powder.

9. The gas exchange valve drive according to claim 8, wherein the soft magnetic form body of the stator (18) comprises at least one core (62) with cobalt-containing iron in its interior space.

10. The gas exchange valve drive according to claim 1, wherein at least one stator coil (28) is arranged in an area (58) oriented transversely to the direction of movement (B) of the rotor (16) of the partial section (54) with a C-shaped cross-section.

11. The gas exchange valve drive according to claim 1, wherein at least two partial sections (54) with a C-shaped cross-section and comprising at least one stator coil (28) are arranged distributed along the circumference of the stator (18).

12. The gas exchange valve drive according to claim 1, wherein the rotor (16) is assigned a displacement transducer (32, 34) for detecting the stroke of the valve member (12).

13. The gas exchange valve drive according to claim 1, wherein for braking and holding the rotor (16) in at least one of its end positions a magnet ring (70) with a radial magnetic orientation, which surrounds the rings (30) of the rotor (16) or is surrounded by them is arranged in the area of the respective end position of the rotor (16) in such a manner that one ring (30) of the rotor (16) with the same magnetic orientation as the magnet ring (70) passes same prior to reaching the end position, in order to subsequently assume the end position.

14. The gas exchange valve drive according to claim 1, wherein the rotor is at least partially surrounded by a magnetic yoke body (42).

15. The gas exchange valve drive according to claim 14, wherein a magnetic yoke body (42) is formed by a magnetically conductive tube (42), preferably with a rectangular cross-section, in which recesses (42*a*, 42*b*) are provided in two opposite walls, through which the rotor and the stator protrude, with the walls having such a material thickness and such a distance from one another that they are in alignment with two teeth (22) of one stator (18).

16. The gas exchange valve drive according to claim 15, wherein the stator (18) comprises a strip-wound coil (18') from as soft magnetic sheet metal strip.

17. The gas exchange valve drive according to claim 1, wherein the teeth (22) or the oppositely located permanent magnetic rings (30), respectively, are dimensioned relative to the axial extension of a winding chamber (26) in such a manner that there is space for at least two further permanent magnetic rings (30) on a section of the rotor (16), with the axial extension of the rotor (16) corresponding to the axial extension of the teeth (22) and the winding chamber (26).

18. An internal combustion engine with at least one combustion cylinder, comprising at least one gas exchange valve with the characteristics recited in claim 1.

19. The gas exchange valve drive according to claim 10, wherein at least two partial sections (54) with a C-shaped cross-section and comprising at least one stator coil (28) are arranged distributed along the circumference of the stator (18).

20. The gas exchange valve drive according to claim 1, wherein at least one stator coil (28) is arranged in an area (60) oriented essentially parallel to the direction of movement (B) of the rotor (16) of the partial section (54) with a C-shaped cross-section.

21. The gas exchange valve drive according to claim 1, wherein at least one stator coil (28) is arranged in an inner area of the stator oriented essentially parallel to the direction of movement (B) of the rotor (16) and concentrically surrounding same.

22. The gas exchange valve drive according to claim 20, wherein at least two partial sections (54) with a C-shaped cross-section and comprising at least one stator coil (28) are arranged distributed along the circumference of the stator (18).

23. The gas exchange valve drive according to claim 21, wherein at least two partial sections (54) with a C-shaped cross-section and comprising at least one stator coil (28) are arranged distributed along the circumference of the stator (18).

* * * * *